(12) United States Patent
Hong et al.

(10) Patent No.: US 7,746,322 B2
(45) Date of Patent: Jun. 29, 2010

(54) MOUSE DEVICE WITH KEYS

(75) Inventors: Lin-Yun Hong, Shenzhen (CN); Hsuan-Chen Chen, Taipei Hsien (TW); Chien-Li Tsai, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 729 days.

(21) Appl. No.: 11/616,864

(22) Filed: Dec. 28, 2006

(65) Prior Publication Data
US 2007/0211030 A1 Sep. 13, 2007

(30) Foreign Application Priority Data
Mar. 8, 2006 (CN) .................... 2006 2 0056084 U

(51) Int. Cl.
*G06F 3/033* (2006.01)
(52) U.S. Cl. ...................................... 345/163; 345/168

(58) Field of Classification Search ....................... None
See application file for complete search history.

(56) References Cited

U.S. PATENT DOCUMENTS

| 3,906,814 | A | * | 9/1975 | Magnussen ............. 74/483 PB |
| 6,677,930 | B2 | | 1/2004 | Nakamura et al. |
| 2003/0137491 | A1 | * | 7/2003 | Kuo ........................... 345/163 |
| 2005/0052417 | A1 | * | 3/2005 | Chi ............................ 345/163 |
| 2005/0073501 | A1 | | 4/2005 | Chen |
| 2006/0164392 | A1 | | 7/2006 | Mao |
| 2006/0267941 | A1 | | 11/2006 | Chen et al. |

* cited by examiner

*Primary Examiner*—Alexander Eisen
*Assistant Examiner*—Robin Mishler
(74) *Attorney, Agent, or Firm*—Wei Te Chung

(57) ABSTRACT

A mouse device includes a case, a click operating area mounted on the case, a key inputting area mounted on the case, and a key lock moveably attached to the case. The click operating area performs selection and/or scrolling within an active window or graphical user interface. The key inputting area includes a plurality of keys. The key lock is moveable between a first position where the keys are unlocked and a second position where the keys are locked.

19 Claims, 6 Drawing Sheets

MOUSE DEVICE WITH KEYS

BACKGROUND OF THE INVENTION

1. Field of the Invention

The present invention generally relates to mouses, and, more particularly, to a mouse combined with input keys.

2. Description of Related Art

Due to unceasing development and research of information products, computer technology has enjoyed considerable progressing function and speed. However, the methods for computer operation and document editing have not had any obvious improvement.

In general, the present method for computer operation or document editing requires the user to remember many special key combinations to accomplish special tasks or to use a mouse to select a function item. Users have to frequently move their hands between the mouse and the keyboard, which is inconvenient.

Accordingly, a need exists for an improved mouse device resolving the above problem in the industry.

SUMMARY OF THE INVENTION

According to one aspect, a mouse device includes a lower case, a circuit board mounted to the lower case, an intermediate plate mounting a plurality of keys thereon, a switching plate positioned on the key plate, and an upper case coupled to the lower case. The circuit board includes a plurality of contact switches. The keys are corresponding to the contact switches, and each of the keys defines a notch therein. The switching plate is moveable on the intermediate plate to enter the notches or escape from the notches to lock or unlock the keys. The upper case defines a plurality of holes to allow the keys to extend therethrough.

According to another aspect, a mouse device includes a case, a click operating area mounted on the case, a key input area mounted on the case, and a key lock moveably attached to the case. The click operating area performs selection and/or scrolling within an active window or graphical user interface. The key input area includes a plurality of keys. The key lock is moveable between a first position where the keys are unlocked and a second position where the keys are locked.

Other systems, methods, features, and advantages of the present hooking device will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF THE DRAWINGS

Many aspects of the present mouse device can be better understood with reference to the following drawings. The components in the drawings are not necessarily drawn to scale, emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe the preferred embodiments of the present mouse device, in detail.

Figure 1:
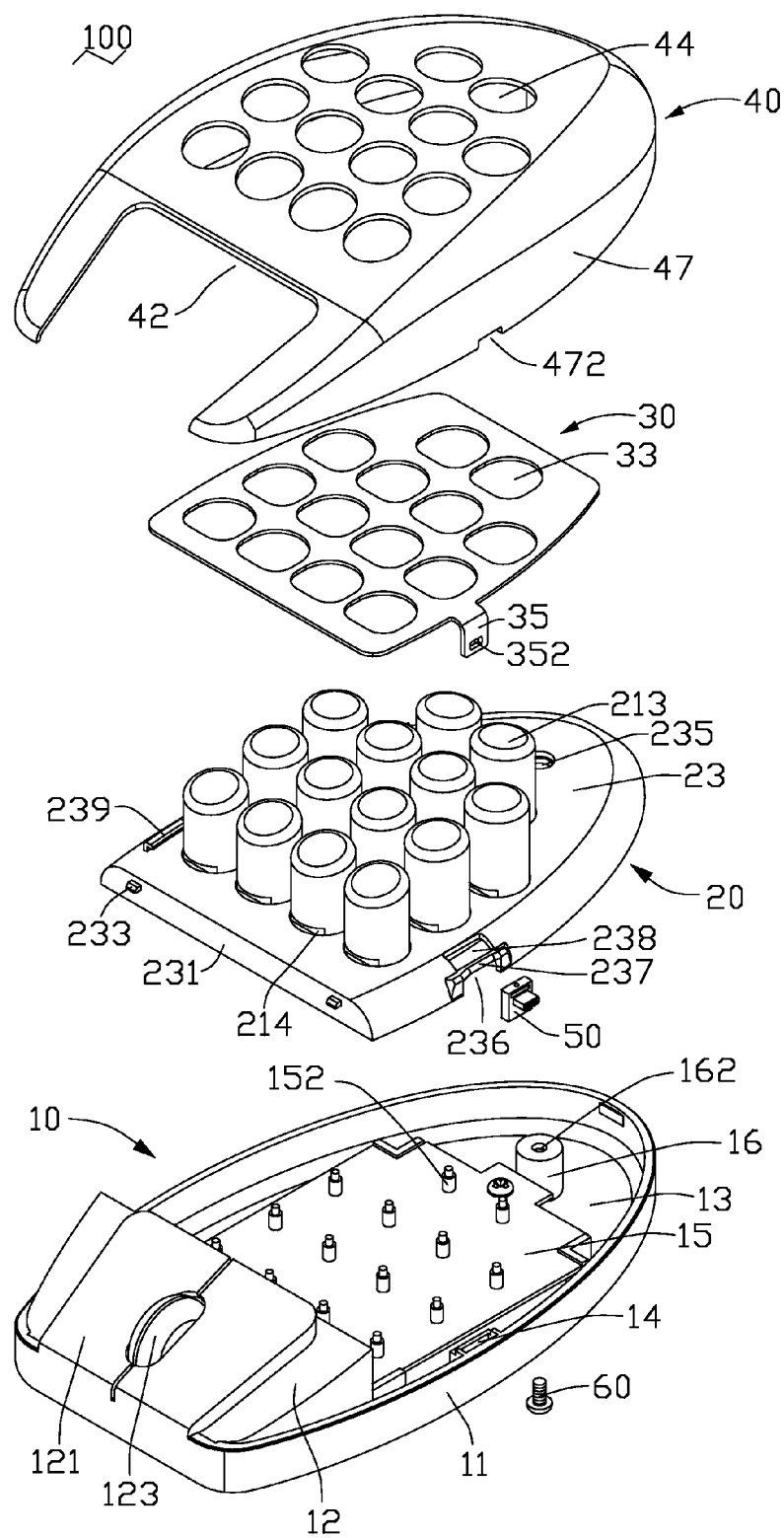
FIG. 1 is an exploded, isometric view of a mouse device in accordance with an exemplary embodiment, the mouse device including a lower case, an intermediate plate, a switching plate, an upper case, and a key lock.

Referring to FIG. 1, a mouse device 100, which is a hand-operated electronic device controlling movement of a cursor on a computer screen by movement of the mouse 100 on a supporting surface, in accordance with an exemplary embodiment is illustrated. The mouse device 100 includes a lower case 10, an intermediate plate 20, a switching plate 30, an upper case 40, and a key lock 50. The intermediate plate 20 is received in the lower case 10. The switching plate 30 is located on the intermediate plate 20. The upper case 40 is coupled to the lower case 10, thus encasing the intermediate plate 20 and the switching plate 30.

The lower case 10 includes a side wall 11, an operating area 12, and a bottom board 13. The side wall 11 surrounds the bottom board 13, and the operating area 12 is at a front of the bottom board 13. A receiving housing 14 is formed on an inner surface of the side wall 11. A circuit board 15 with a plurality of contact switches 152 is fixed to the bottom board 13 by a screw. A securing post 16 extends upward at a back of the bottom board 13. The securing post 16 defines a second through hole 162 therein for allowing a screw 60 to extend therethrough.

The operating area 12 includes a pair of juxtaposed click switches 121 and a rolling wheel 123 between the click switches 121. The click switches 121 are resiliently pressable. The click switches 121 are respectively called a "left click button" and a "right click button". The rolling wheel 123 is rotated to scroll a cursor up or down within an active window or GUI (graphical user interface) element.

Figure 2:
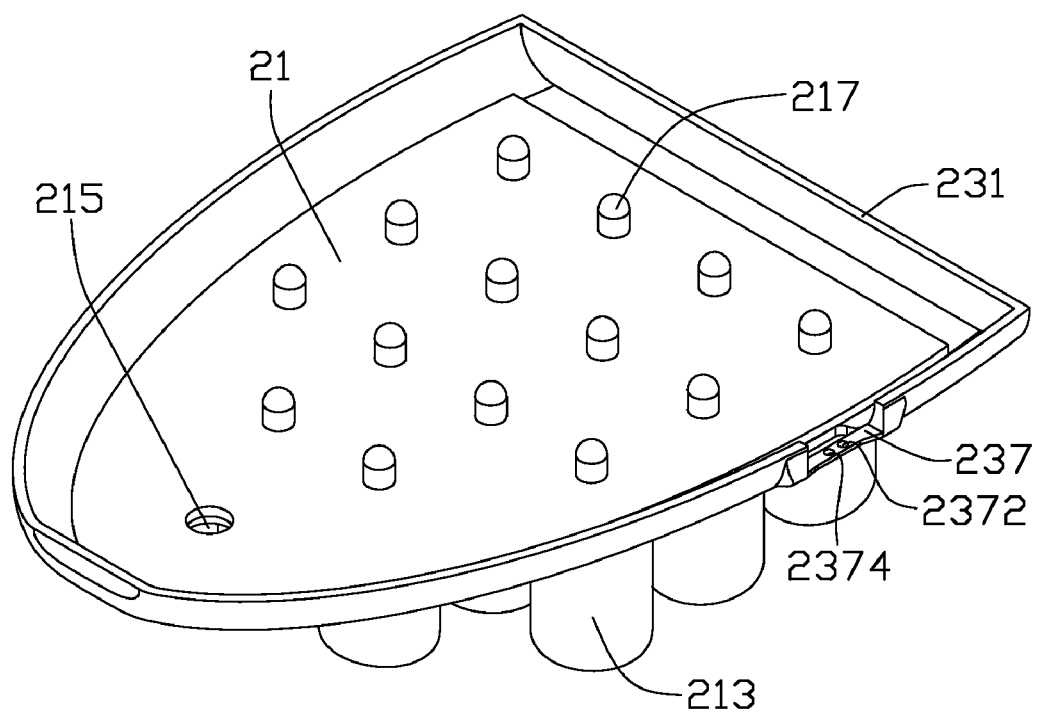
FIG. 2 is an inverted, isometric view of the intermediate plate of FIG. 1

Referring to FIG. 2 together with FIG. 1, the intermediate plate 20 includes a key board 21 and a mounting board 23 superposed over the key board 21. The key board 21 mounts a plurality of cylindrical keys 213 thereon, corresponding to the contact switches 152 on the circuit board 15. Each of the keys 213 forms a contact protrusion 217 at a bottom thereof for pressing the corresponding contact switch 152 to generate an electric signal. A first through hole 215 is defined in a back of the key board 21. The key board 21 is attached to the mounting board 23, with the keys 213 protruding from the mounting board 23. Each of the keys 213 defines a notch 214 at a bottom of a side thereof. The notches 214 are slightly higher than an upper surface of the mounting board 23. A pair of clasping blocks 233 is formed at an end surface 231 of the mounting board 23. The clasping blocks 233 are claspable to the operating area 12. A screw hole 235 is defined at a back of the mounting plate 23 corresponding to the second through hole 162 in the securing post 16. The intermediate plate 20 is mounted to the lower case 10 with the screw 60. A cutout 236 is defined at an edge of a lateral side of the mounting board 23, an opening 238 is defined adjacent to the cutout 236 at the lateral side, and a fixing bar 237 is thus formed between the cutout 236 and the opening 238. A first recess 2372 and a second recess 2374 are defined, in a bottom of the fixing bar 237, at two different positions along the lateral side respectively. A guiding rib 239 having an inverted-L shaped cross section is formed at the other lateral side of the mounting board 23.

The switching plate 30 defines a plurality of first holes 33 therein, corresponding to the keys 213 on the intermediate plate 20. Each of the first holes 33 has a profile slightly larger than that of the corresponding key 213. The keys 213 can extend through the first holes 33. An engaging strip 35 is bent down from a lateral side of the switching plate 30. The engaging strip 35 is receivable in the opening 238, and defines a groove 352 therein.

The upper case 40 defines a plurality of second holes 44 in a top board, corresponding to the keys 213. A gap 42 is defined in a front of the top board for receiving the operating area 12. An indentation 472 is defined at a lateral wall 47 of the upper case 40.

Figure 3:
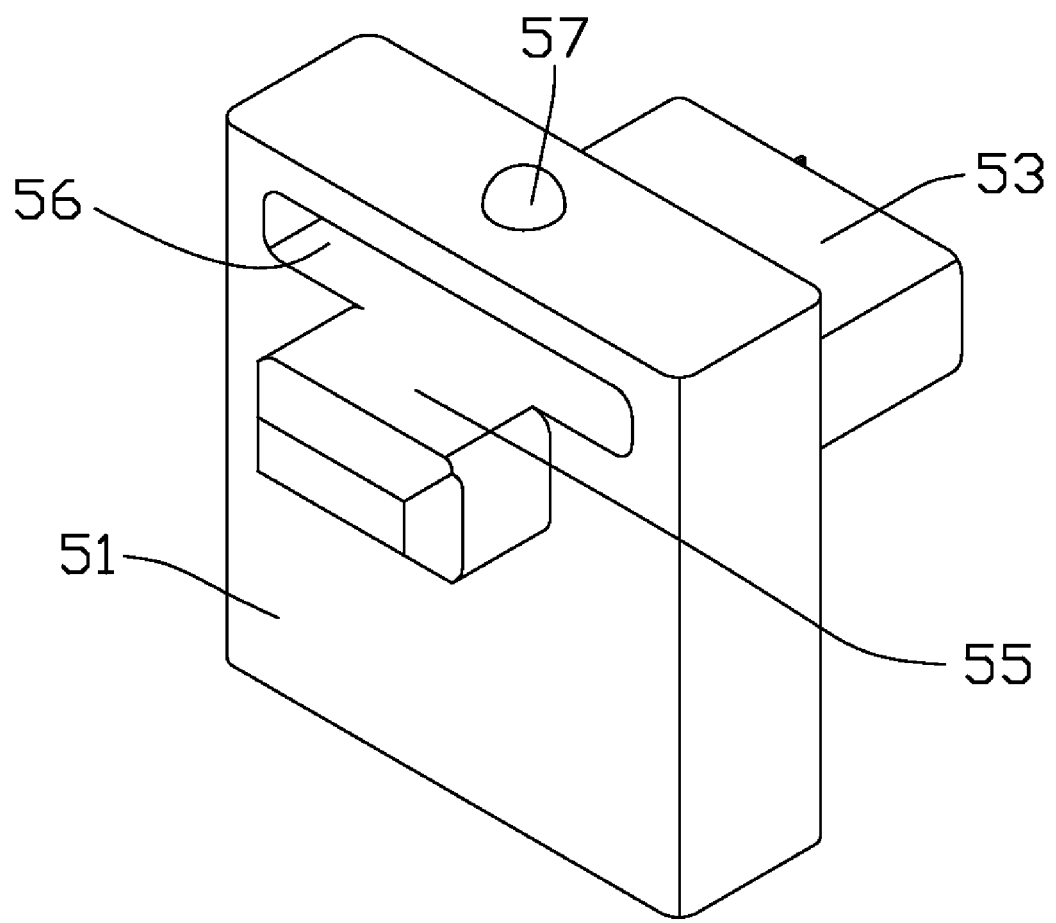
FIG. 3 is an enlarged, isometric view of the key lock of FIG. 1.

Referring to FIG. 3, the key lock 50 forms a main portion 51, and a pushing portion 53 and an engaging tongue 55 respectively extend from opposite sides of the main portion 51. The pushing portion 53 is used to apply an external force thereon. The engaging portion 55 is receivable in the groove 352 in the engaging strip 35. A slot 56 is defined in the main portion 51, above the engaging portion 55. A projection 57 protrudes from a top of the main portion 51. The projection 57 is receivable in the first recess 2372 or the second recess 2374.

Figure 4:
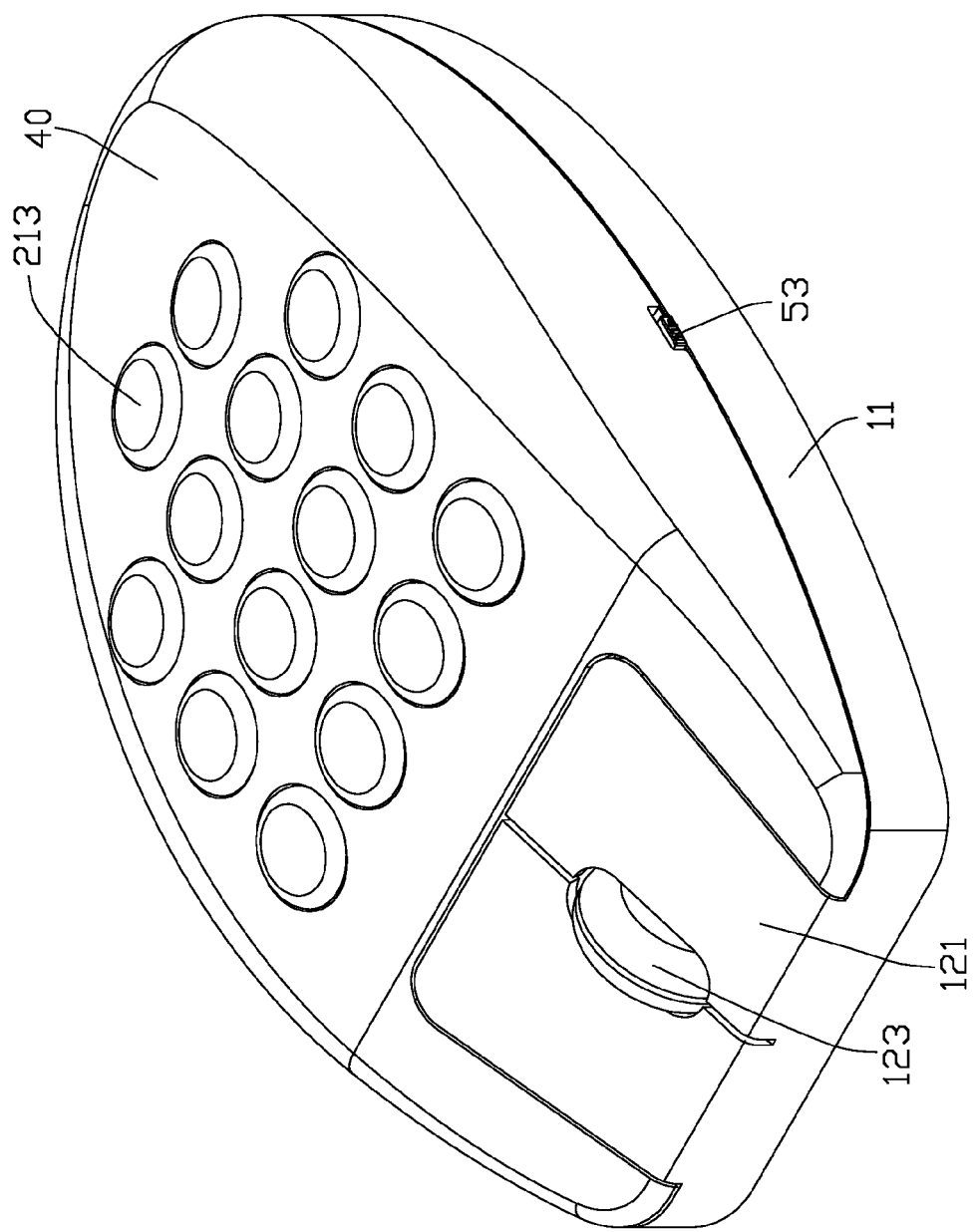
FIG. 4 is an assembled, isometric view of the mouse device of FIG. 1.
Figure 5:
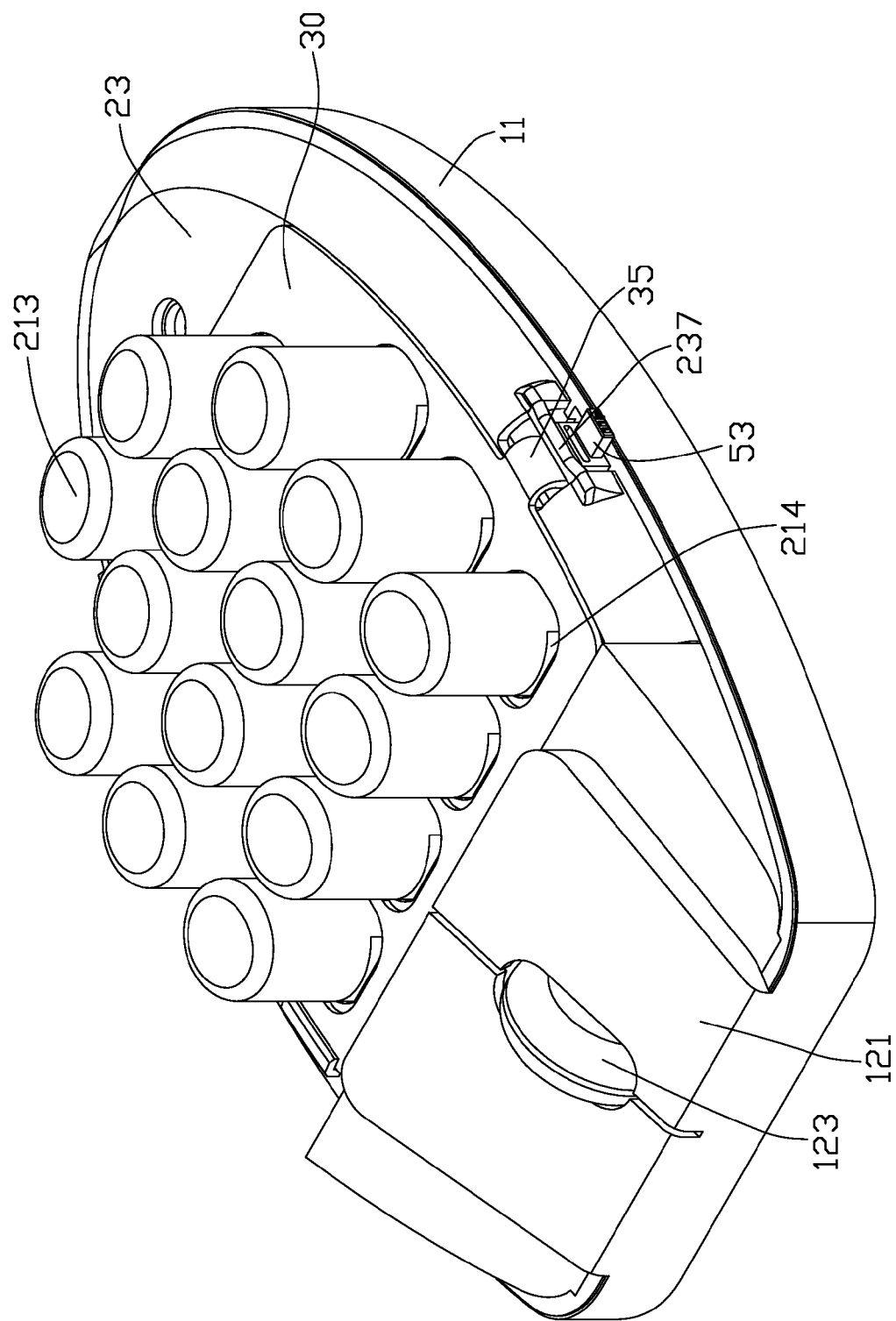
FIG. 5 is an assembled, isometric view of the mouse device, the upper case being removed, keys being unlocked.
Figure 6:
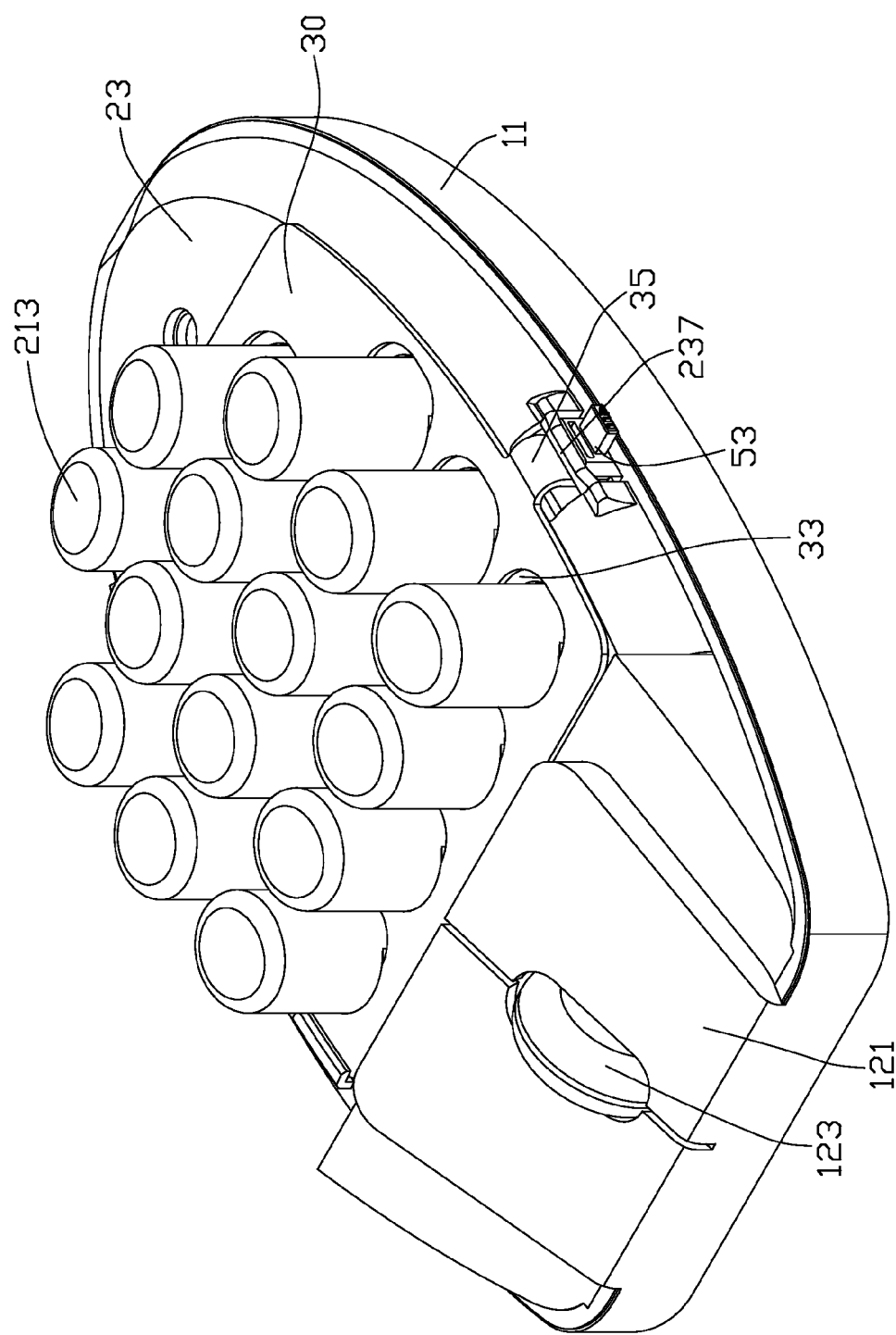
FIG. 6 is similar to FIG. 5, but with the keys being locked.

Referring to FIG. 4 and FIG. 5, the switching plate 30 is superposed over the intermediate plate 20 in a first step of assembly. The engaging strip 35 extends through the opening 238. The key lock 50 is engaged with the switching plate 30, with the engaging portion 55 inserted into the groove 352 in the engaging strip 35. The combination of the intermediate plate 20, the switching plate 30, and the key lock 50 is positioned on the circuit board 15 of the lower case 10. The contact protrusions 217 are aligned with the contact switches 152 on the circuit board 15, and the key lock 50 is partially received in the receiving housing 14. The screw 60 is screwed into the screw hole 235 via the second through hole 162 and the first through hole 215. The upper case 40 is finally coupled to the lower case 10.

In use, the mouse device 100 can shift between two different states. In the first state, the keys 213 are unlocked and pressable to input information. In a second state, the keys 213 are locked and unpressable to prevent accidental pressing of the keys 213. When shifting from the first state to the second state, the pushing portion 53 of the key lock is forced to move along the indentation 472, and the projection 57 escapes from the first recess 2372 by resilient deformation toward the slot 56, and enters the second recess 2374 and rebounds from the deformation. The switching plate 30 is moved along the guiding rib 239 together with the key lock 50, and enters the notches 214 in the keys 213. Thus, the keys 213 are blocked by the switching plate 30, and cannot be pressed downward. When shifting from the second state to the first state, the key lock 50 is forced to move along the indentation 472 in a reverse direction. The projection 57 in the second recess 2374 escapes therefrom by resilient deformation toward the slot 56 in the key lock 50, and enters the first recess 2372 and rebounds from the deformation.

The mouse device 100 can perform click selection, wheel scrolling, and key input. The keys 213 can be endued with frequently-used functions, such as numerical input and function input. It is convenient for users to work on a computer without having to frequently move their hands between a keyboard and a mouse. The keys 213 of the mouse device 100 can be locked to avoid accidental pressing of the keys.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A mouse device, comprising:
   a lower case;
   a circuit board mounted to the lower case, the circuit board including a plurality of contact switches;
   an intermediate plate mounting a plurality of keys thereon, the keys corresponding to the contact switches, each of the keys comprising a notch;
   a switching plate positioned on the intermediate plate, the switching plate comprising a plurality of through holes for extension of the keys therethrough, the switching plate being moveable on the intermediate plate to enter the notches or escape from the notches to lock or unlock the keys; and
   an upper case coupled to the lower case, the upper case comprising a plurality of holes to allow the keys to extend therethrough.

2. The mouse device as claimed in claim 1, further comprising a key lock, the key lock being engaged with the switching plate.

3. The mouse device as claimed in claim 2, wherein the switching plate forms an engaging strip with a groove, the key lock is engaged in the groove, and the switching plate is movable via manipulation on the key lock.

4. The mouse device as claimed in claim 2, wherein the key lock forms a projection, the intermediate plate forms a fixing bar with a first recess and a second recess, and the projection is selectively engaged in the first recess or the second recess.

5. The mouse device as claimed in claim 4, wherein when the projection of the key lock is in the first recess, the keys are unlocked via the switching plate disengaging from the notches; when the projection of the key lock is in the second recess, the keys are locked via the switching plate engaging with the notches.

6. The mouse device as claimed in claim 5, wherein the key lock comprises a slot under the projection for providing a deformation space to the key lock.

7. The mouse device as claimed in claim 1, wherein a guiding rib having an inverted-L shape is formed on the intermediate plate, and the guiding rib slidably engages with the switching plate for guiding a movement of the switching plate.

8. The mouse device as claimed in claim 1, wherein the key lock forms a pushing portion to be applied a force thereon to push the key lock.

9. The mouse device as claimed in claim 8, wherein the upper case comprises an indentation therein to receive the pushing portion therein.

10. The mouse device as claimed in claim 1, further comprising an operating area, and the operating area including a pair of click switches and a rolling wheel between the click switches.

11. A mouse device, comprising:

a case;

a click operating area mounted on the case, the click operating area performing selection and/or scrolling within an active window or graphical user interface;

a key input area mounted on the case, the key input area including a plurality of keys;

a key lock moveably attached to the case, the key lock being movable between a first position where the keys are unlocked and a second position where the keys are locked: and a switching plate engaged with the key lock, and the switching plate being moveable together with the key lock when the key lock is moved between the first and second positions to engage with the keys for preventing the keys being pressed or release the keys for inputting information, wherein the keys each comprises a notch for the switching plate to move in the notches to lock the keys.

12. The mouse device as claimed in claim 11, wherein the key lock forms a pushing portion to be applied a force thereon to push the key lock.

13. The mouse device as claimed in claim 11, wherein a guiding rib having an inverted-L shape is engaged with the switching plate to guide a movement of the switching plate.

14. The mouse device as claimed in claim 11, wherein the key lock forms a projection, and the projection is selectively engaged in a first recess or a second recess, wherein the key putting area comprises the first recess and the second recess.

15. The mouse device as claimed in claim 14, wherein when the projection of the key lock is in the first recess, the keys are unlocked; when the projection of the key lock is in the second recess, the keys are locked.

16. A mouse device, comprising:

a case comprising a lower case and an upper case;

a click operating area disposed at the upper case, the click operating area performing selection and/or scrolling within an active window or graphical user interface;

a key input area disposed at the upper case and separated from the click operating area, the key input area including a plurality of keys being pressable from outside of the case to input information, each of the keys comprising a notch;

a switching plate disposed between the upper case and the lower case, the switching plate comprising a plurality of through holes for extension of the keys; and a key lock engaged with the switching plate, the key lock having a pushing portion extending to outside of the case and being pressable to move between a first position where the switching plate engages with the notches of the keys to thereby lock the keys and a second position where the switching plate disengages from the notches of the keys to thereby unlock the keys.

17. The mouse device as claimed in claim 16, wherein one of the key lock and the intermediate plate forms a projection, the other one of the key lock and the intermediate plate comprises a pair of recesses, and the projection is selectively engaged in one of the recesses to retain the key lock in a corresponding one of the first and second positions.

18. The mouse device as claimed in claim 11, wherein the switching plate comprising a plurality of through holes for extension of the keys, when the keys are locked, the portions bounding the through holes of the switching plate correspondingly engage with the notches of the keys.

19. The mouse device as claimed in claim 11, wherein the switching plate defining a plurality of through holes for extension of the keys, when the keys are locked, the portions bounding the through holes of the switching plate correspondingly engage with the notches of the keys.

* * * * *